United States Patent
Pilon et al.

(10) Patent No.: US 10,823,076 B2
(45) Date of Patent: Nov. 3, 2020

(54) DEVICE FOR MONITORING A TURBINE ENGINE OF AN AIRCRAFT

(71) Applicant: Airbus Operations (S.A.S.), Toulouse (FR)

(72) Inventors: Antoine Pilon, Saint Lys (FR); Florence Bert, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 304 days.

(21) Appl. No.: 16/017,776

(22) Filed: Jun. 25, 2018

(65) Prior Publication Data
US 2019/0003396 A1 Jan. 3, 2019

(30) Foreign Application Priority Data
Jun. 29, 2017 (FR) ...................... 17 56040

(51) Int. Cl.
*F02C 7/25* (2006.01)
*B64D 45/00* (2006.01)
(Continued)

(52) U.S. Cl.
CPC .................. *F02C 7/25* (2013.01); *A62C 3/08* (2013.01); *B64D 45/00* (2013.01); *G08B 29/188* (2013.01);
(Continued)

(58) Field of Classification Search
CPC .. F02C 7/25; A62C 3/08; B64D 45/00; B64D 2045/009; G08B 29/18; F05D 2220/323; F05D 2260/80; F05D 2270/3032
See application file for complete search history.

(56) References Cited

U.S. PATENT DOCUMENTS 6,961,445 B1* 11/2005 Jensen ................. G08B 13/194
348/208.15
9,976,907 B1* 5/2018 Wright .................. G01J 5/0088
(Continued)

FOREIGN PATENT DOCUMENTS

DE 10 2006 058490 A1 6/2008
EP 1 829 006 A1 9/2007
(Continued)

OTHER PUBLICATIONS

French Search Report for French Application No. 1756040 dated Mar. 7, 2018.
(Continued)

*Primary Examiner* — Rodney A Bonnette
(74) *Attorney, Agent, or Firm* — Jenkins, Wilson, Taylor & Hunt, P.A.

(57) ABSTRACT

An aircraft including at least one turbine engine and a monitoring device associated with the turbine engine, the turbine engine being linked firstly to circuits including fluid circuits and electric circuits, and secondly to sensors for monitoring the turbine engine and the circuits, the sensors including at least one fire sensor and sensors for monitoring the fluid circuits, sensors for monitoring the electric circuits and sensors for monitoring the operation of the turbine engine, the monitoring device being linked to the sensors and including a central processing unit to generate a signal indicating the occurrence of a fire on the turbine engine only if a fire sensor and a sensor for monitoring a fluid circuit or an electric circuit or the operation of the turbine engine transmit a signal indicating an anomaly.

4 Claims, 3 Drawing Sheets

(51) Int. Cl.
  *G08B 29/18* (2006.01)
  *A62C 3/08* (2006.01)
(52) U.S. Cl.
  CPC .. *B64D 2045/009* (2013.01); *F05D 2220/323* (2013.01); *F05D 2260/80* (2013.01); *F05D 2270/3032* (2013.01)

(56) References Cited

U.S. PATENT DOCUMENTS

| | | | | |
|---|---|---|---|---|
| 2010/0177801 | A1* | 7/2010 | Geren | G01K 5/58 |
| | | | | 374/117 |
| 2012/0186835 | A1* | 7/2012 | Meier | A62C 99/0018 |
| | | | | 169/46 |
| 2013/0294900 | A1 | 11/2013 | Graily | |
| 2014/0158382 | A1* | 6/2014 | Ferguson | A62C 37/36 |
| | | | | 169/46 |
| 2017/0096238 | A1 | 4/2017 | Porte et al. | |
| 2017/0345318 | A1* | 11/2017 | Kim | G08G 5/0052 |
| 2017/0363514 | A1* | 12/2017 | Pilon | G05D 1/0072 |

FOREIGN PATENT DOCUMENTS

| | | |
|---|---|---|
| EP | 1 829 006 B1 | 2/2010 |
| EP | 3 421 375 B1 | 8/2019 |

OTHER PUBLICATIONS

European Search Report for Application No. 18177682.4 dated Oct. 29, 2018.

* cited by examiner

DEVICE FOR MONITORING A TURBINE ENGINE OF AN AIRCRAFT

CROSS-REFERENCE TO RELATED APPLICATION

This patent application claims priority to French patent application FR 17 56040, filed on Jun. 29, 2017, the entire disclosure of which is incorporated by reference herein.

TECHNICAL FIELD

The disclosure herein relates to an aircraft comprising a device for monitoring a turbine engine making it possible to inform the crew of the aircraft about the occurrence of a fire on the turbine engine.

BACKGROUND

A turbine engine of a commercial aircraft comprises a plurality of fire sensors connected to a monitoring device (of the FDU, meaning fire detection unit, type) configured to send a fire warning message when a fire is detected in the turbine engine.

Upon receiving a fire warning message, the crew must divert the attention thereof away from the current piloting actions in order to concentrate on implementing counter-measures against the fire, like, for example, actuating fire-extinguishing devices or reducing the thrust of the turbine engine.

Such means for detecting the occurrence of a fire on the turbine engine are effective but there are rare cases in which the crew can receive a fire warning message while no fire is proven to exist.

It is necessary to assure the crew that each fire warning message indicates a genuine fire instance on a turbine engine such that counter-measures are not implemented needlessly.

An aim of the disclosure herein is to improve the decision-making assistance to make sure that the fire warning messages are not false warnings.

SUMMARY

To this end, the disclosure herein relates to an aircraft comprising at least one turbine engine and a monitoring device associated with the turbine engine, the turbine engine being linked firstly to a plurality of circuits including fluid circuits and electric circuits, and secondly to a plurality of sensors for monitoring the turbine engine and the plurality of circuits, the plurality of sensors comprising at least one fire sensor and sensors for monitoring the fluid circuits, sensors for monitoring the electric circuits and sensors for monitoring the operation of the turbine engine, the monitoring device being linked to the plurality of sensors and comprising a central processing unit configured to generate a signal indicating the occurrence of a fire on the turbine engine only if a fire sensor and a sensor for monitoring a fluid circuit or an electric circuit or the operation of the turbine engine transmit a signal indicating an anomaly.

Thanks to the disclosure herein, the crew is assured that each fire warning message indeed relates to an actual fire instance for the turbine engine.

BRIEF DESCRIPTION OF THE DRAWINGS

Features of the disclosure herein that are mentioned above, as well as other features, will emerge upon reading the following description of exemplary embodiments, the description being given with reference to the appended FIG. 1.

DETAILED DESCRIPTION

Figure 1:
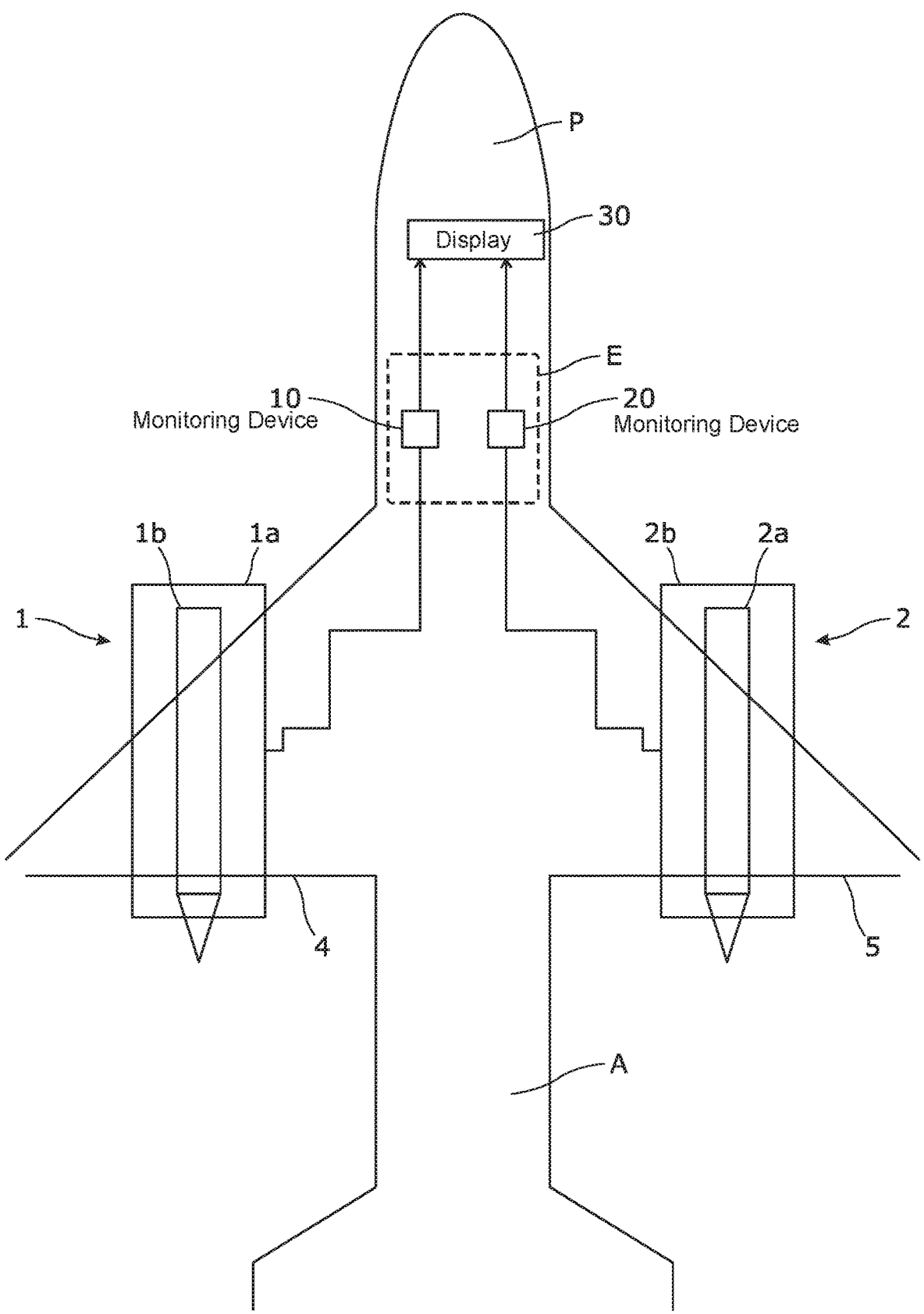
FIG. 1 is a schematic view of an aircraft according to an embodiment of the disclosure herein, the aircraft comprising two turbine engines and a monitoring device associated with each turbine engine.

With reference to FIG. 1, the aircraft A comprises two turbine engines 1, 2 which are, for example, each fixed under a wing 4, 5 of the aircraft A. Each of the turbine engines 1, 2 comprises an engine 1b, 2b surrounded by a nacelle 1a, 2a, and the turbine engine is linked to a plurality of circuits (not shown) including liquid fluid circuits, called fluid circuits (ATA28/29/30: hydraulics, oil, fuel) and electric circuits (ATA24) in order to operate the turbine engine, and to a plurality of sensors (see FIG. 2) CE, CF, CI, CM for monitoring the turbine engine and circuits for monitoring the operation of the turbine engine. In particular, each turbine engine comprises at least one fire sensor CI, a plurality of sensors for monitoring the fluid circuits CF, a plurality of sensors for monitoring the electric circuits CE and a plurality of sensors for monitoring the operation of the turbine engine CM.

In a known manner, each sensor CE, CF, CI, CM generates a signal indicating an anomaly (depending on the type of sensor: fire, liquid leak, short circuit/electric arc, problem in the operation of the turbine engine) when the parameter that it measures exceeds a threshold predetermined value.

According to the disclosure herein, the aircraft A further comprises, associated with each turbine engine 1, 2, a monitoring device 10, 20 of FDU (meaning fire detection unit) type, linked to the plurality of sensors CE, CF, CI, CM in order to generate a warning in the case of a fire occurring on the turbine engine 1, 2. The monitoring devices 10, 20 are, for example, arranged in the avionics bay E of the aircraft.

The monitoring device 10, 20 for a turbine engine 1, 2 implements a logic that aims, when a fire sensor CI transmits a signal indicating a fire, to analyze the environment of the fire sensor in order to check that at least one other sensor from a sensor for monitoring a fluid circuit CF or an electric circuit CE or the operation of the turbine engine CM also transmits a signal indicating an anomaly, in order to ensure that the signal indicating a fire is justified and must be taken into account by the crew.

The aircraft A finally comprises a cockpit P comprising at least one display screen 30 connected to the monitoring devices 10, 20. Each monitoring device 10, 20 sends fire warning display instructions to the display screen 30 when a fire is detected on the turbine engine 1, 2.

The fluid circuits comprise members such as pumps, valves and ducts for the transfer of fluid and the sensors for monitoring the fluid circuits CF are, for example, sensors for pressure, flow rate, etc. The electric circuits comprise electronic devices and cables for supplying power to the various elements and circuits of the turbine engine. The sensors for monitoring the electric circuits CE are, for example, sensors for current, voltage, etc.

The fire sensors CI are, for example, of the gas detection loop type for which the detection of a fire is effective when the value of the temperature detected by the sensor is above a threshold predetermined value.

The sensors for monitoring the operation of the turbine engine CM monitor the parameters for the operation of the turbine engine (vibration, temperatures, speed, air flow rate, etc.) and are, for example, sensors for vibrations, temperature, rotational speed, flow rate, etc.

Figure 2:
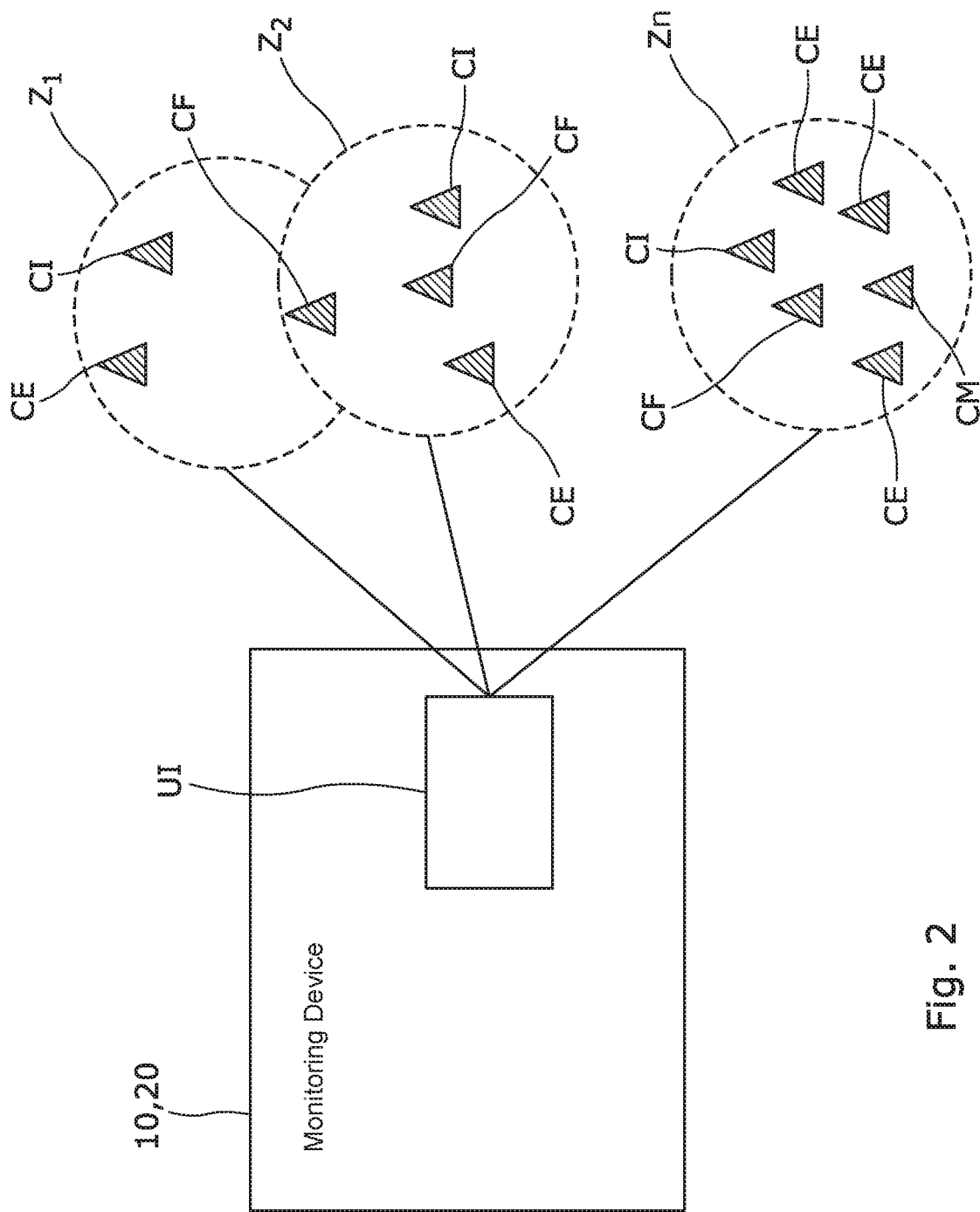
FIG. 2 is a schematic view of a monitoring device of FIG. 1, which monitoring device is associated with a turbine engine according to an embodiment of the disclosure herein.

With respect to FIG. 2, each monitoring device 10, 20 for a turbine engine comprises a central processing unit UI implementing the logic according to the disclosure herein as described above.

The output signal of each sensor CI, CE, CF, CM comprises, for example, a bit set to 0 when the value measured by the sensor is in a range of acceptable values (less than a threshold predetermined value), and otherwise set to 1 in order to indicate an anomaly (depending on the type of sensor: fire, liquid leak, short circuit/electric arc, problem in the operation of the turbine engine).

Figure 3:
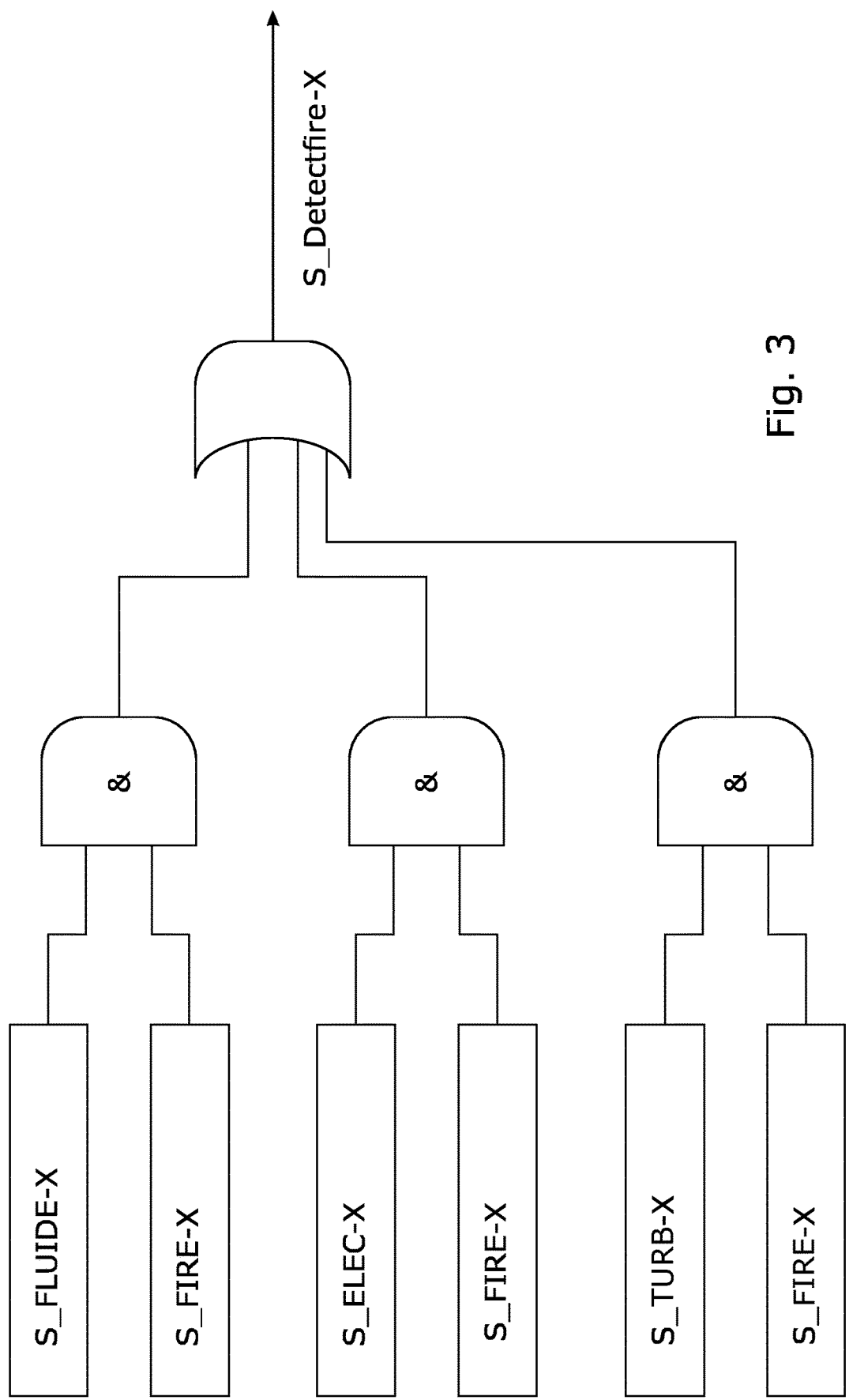
FIG. 3 is a diagram of a logic for monitoring a turbine engine implemented by a monitoring device of FIG. 2.

The logic implemented by the central processing unit UI is detailed in FIG. 3 by considering that a fire sensor CI transmits an output signal S_FIRE-x, that a sensor dedicated to monitoring a fluid circuit CF transmits an output signal S_FLUID-x, that a sensor dedicated to monitoring an electric circuit CE transmits an output signal S_ELEC-x, and that a sensor dedicated to monitoring the operation of the turbine engine CM transmits an output signal S_TURB-x.

The output signal S_ELEC-x of each sensor dedicated to an electric circuit CE is received, with the output signal S_FIRE-x of the fire sensor CI, at the input of an AND logic gate, the output signal S_FLUID-x of each sensor dedicated to a fluid circuit CF is received, with the output signal S_FIRE-x of the fire sensor CI, at the input of an AND logic gate, and the output signal S_TURB-x of each sensor dedicated to monitoring the operation of the turbine engine CM is received, with the output signal S_FIRE-x of the fire sensor CI, at the input of an AND logic gate.

The output signal of each AND logic gate is set to 1 if the two input signals are set to 1, i.e. for each AND logic gate, if the fire sensor CI and the other sensor CE, CF, CM both detect an anomaly.

The output signals of the AND logic gates are received at the input of an OR logic gate, the output signal S_Detectfire-x, indicating a fire, of which is set to 1 if at least one input signal of the OR logic gate is at 1.

When the signal S_Detectfire-x is set to 1, the central processing unit UI of the monitoring device 10, 20 generates a fire warning display instruction signal S_Inst intended for the display screen 30 such that the latter indicates, via a warning message, that a fire has started on the turbine engine 1, 2 associated with the monitoring device 10, 20.

Unlike the prior art in which the information from a fire sensor CI could alone trigger the display of a fire warning message intended for the crew, the logic according to the disclosure herein checks the information of the fire sensor CI against the information from the other sensors CE, CF, CM dedicated to monitoring the fluid, electric circuits or the operation of the turbine engine such as to display a fire warning message intended for the crew which has a high degree of reliability.

For example:
the detection of a short circuit or of an arc, or a large fluctuation in the electric parameters together with the detection of a fire establish with certainty the presence of a fire in the turbine engine 1, 2 and that urgent counter-measures must be taken by the crew in order to extinguish the fire; or the detection of a large fluctuation in the operating parameters for the turbine engine, together with the detection of a fire establish with certainty the presence of a fire in the turbine engine 1, 2 and that urgent counter-measures must be taken by the crew to extinguish the fire; or the detection of a flammable liquid leak together with the detection of a fire establish with certainty the presence of a fire in the turbine engine 1, 2 and that urgent counter-measures must be taken by the crew in order to stop the fire.

Preferably, when the turbine engine comprises a plurality of fire sensors CI, the logic according to the disclosure herein is available in an identical manner in various monitoring groups Z1, Z2, . . . Zn where each group is formed from a single fire sensor CI associated with at least one monitoring sensor taken from a sensor for monitoring an electric circuit CE, a sensor for monitoring the operation of the turbine engine CM or a sensor for monitoring a fluid circuit CF. It will be noted that a fire sensor can belong to several monitoring groups.

A monitoring sensor CE, CF, CM associated with a fire sensor, for example, a monitoring sensor associated arbitrarily with the fire sensor CI, or which is located in a same fire confinement zone of the turbine engine 1, 2 as the fire sensor CI or in an adjacent zone.

It will be noted that, unlike the logic of the prior art, in the logic described above, the rupture of a duct of an air circuit (ATA30/36) of the turbine engine 1, 2 transporting hot air (thereby leading to an increase in the temperature beyond the threshold from which the output signal of a fire sensor CI subjected to the stream of hot air is set to 1) does not trigger the display of a fire warning message in the cockpit P.

Therefore, the logic makes it possible to prevent the crew from having to carry out counter-measures against the fire in such a case of hot-air duct rupture. Thus, the crew will be able, instead of carrying out counter-measures against the fire, to make do with using measures necessary to halt the hot air leak.

The disclosure herein has been described by way of example for the detection of a fire on a turbine engine fixed under a wing of an aircraft. The same disclosure herein could be used on a turbine engine fixed to the fuselage of an aircraft, or for example, for an auxiliary power unit (APU) mounted in the fuselage of an aircraft.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   at least one turbine engine; and
   a monitoring device associated with the turbine engine, the turbine engine being linked to a plurality of circuits including fluid circuits and electric circuits, and to a plurality of sensors for monitoring the turbine engine and the plurality of circuits, the plurality of sensors comprising at least one fire sensor and sensors for monitoring the fluid circuits, sensors for monitoring the electric circuits and sensors for monitoring operation of the turbine engine,
   wherein the monitoring device is linked to the plurality of sensors and comprises a central processing unit configured to generate a signal indicating an occurrence of a fire on the turbine engine only if the central processing unit receives a signal indicating an anomaly from a fire sensor and either of a sensor for monitoring a fluid circuit or an electric circuit or the operation of the turbine engine.

2. The aircraft according to claim 1, the aircraft comprising a plurality of fire sensors, wherein each fire sensor is associated with at least one sensor for monitoring a fluid circuit or an electric circuit or the operation of the turbine engine, a fire sensor and the at least one monitoring sensor associated with the fire sensor forming a monitoring group, the central processing unit being configured to generate a signal indicating occurrence of a fire on the turbine engine if, for a monitoring group, the central processing unit receives a signal from the fire sensor and at least one monitoring sensor associated with the fire sensor indicating an anomaly.

3. The aircraft according to claim 2, the aircraft comprising a cockpit comprising a display screen, wherein the central processing unit is configured to send fire warning display instructions to the display screen at a same time as generation of a signal indicating the occurrence of a fire.

4. The aircraft according to claim 1, the aircraft comprising a cockpit comprising a display screen, wherein the central processing unit is configured to send fire warning display instructions to the display screen at a same time as generation of a signal indicating the occurrence of a fire.

* * * * *